United States Patent Office 3,432,491
Patented Mar. 11, 1969

3,432,491
BENZENE SULFONYL SEMICARBAZIDES
Ernst Jucker, Ettingen, Adolf Lindenmann and Erhard Schenker, Basel, and Fulvio Gadient, Birsfelden, Switzerland, assignors to Sandoz Ltd. (also known as Sandoz A.G.), Basel, Switzerland
No Drawing. Filed Oct. 25, 1966, Ser. No. 589,241
Claims priority, application Switzerland, Oct. 27, 1965, 14,813/65
U.S. Cl. 260—239.6
Int. Cl. C07d 41/08; A61k 27/00
14 Claims

ABSTRACT OF THE DISCLOSURE

This invention is directed to heterocyclic sulphonyl semicarbazide derivatives of the formula:

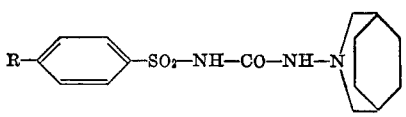

in which R signifies a hydrogen or halogen atom, an alkyl, alkoxy, alkylthio, alkylsulphinyl, alkylsulphonyl, or acyl radical having from 1 to 4 carbon atoms, or the nitro, amino or acetylamino radical, and their alkali metal, alkaline earth metal, and ammonium salts. These compounds are useful in the treatment of diabetes mellitus.

---

The present invention relates to new sulphonyl semicarbazide derivatives and processes for their production.

The present invention provides heterocyclic sulphonyl semicarbazide derivatives of Formula I,

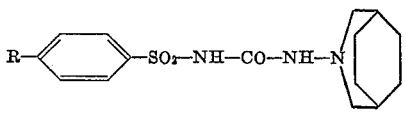

in which R signifies a hydrogen or halogen atom, an alkyl, alkoxy, alkylthio, alkylsulphinyl, alkylsulphonyl or acyl radical having from 1 to 4 carbon atoms, or the nitro, amino or acetylamino radical,
and their alkali metal, alkaline earth metal and ammonium salts.

The present invention further provides the following two processes for the production of the compounds of Formula I and their alkali metal, alkaline earth metal and ammonium salts:

(a) 3-amino-3-azabicyclo[3,2,2]nonane of Formula II

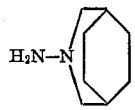

is reacted with a compound of Formula III,

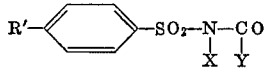

in which

R' has the same significance as R except it may not signify an amino radical, and either
X signifies a hydrogen atom and
Y signifies a radical capable of being removed together with the hydrogen atom of the primary amino radical of the amine of Formula II, or
X and Y together signify a second bond between the carbon and the nitrogen atom, and, when a compound of Formula I in which R signifies a nitro or acetylamino radical results, and the compound I in which R signifies an amino radical is desired, reduction or hydrolysis respectively is effected, and, when an alkali metal, alkaline earth metal or ammonium salt is required, salification is effected.

(b) A compound of Formula IV,

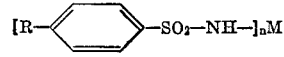

in which

R has the above significance, and
M signifies the cation of an alkali metal or alkaline earth metal, and
n corresponds to the valency of M, is reacted with a compound of Formula V,

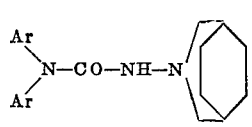

in which the two symbols Ar signify identical or different aromatic radicals which may optionally be substituted, and which may optionally be linked by a single bond, a methylene or ethylene radical or an oxygen or sulphur atom, the resulting compound I is liberated from its alkali metal or alkaline earth metal salts, and, when an alkali metal, alkaline earth metal or ammonium salt is required, salification is effected.

A lower alkoxy radical or the amino radical may be used as the radical Y capable of being split off in Formula III. Suitable starting materials of Formula III are the lower alkyl esters, preferably the methyl or ethyl ester, e.g. of a benzenesulphonyl-carbamic acid, or their amides (i.e. benzenesulphonyl-ureas).

When X and Y in the Formula III signify a second bond between the carbon and the nitrogen atom, the starting materials are benzenesulphonyl-isocyanate and substitution products thereof.

The process (a) may, for example, be effected as follows, depending on the starting materials used:

A solution of 3-amino-3-azabicyclo[3,2,2]nonane and a benzenesulphonyl-carbamic acid ester, e.g. 4-chlorobenzene- or 4-acetylaminobenzenesulphonyl-carbamic acid ethyl ester, in an anhydrous organic solvent, e.g. absolute benzene, toluene, xylene, dimethyl formamide, 1,2-dimethoxyethane or acetonitrile, is heated to the boil at reflux for 1 to 6 hours. After removing the solvent, e.g. by filtration or distillation, the final product is isolated in manner known per se and purified, e.g. by crystallization.

The reaction of compound II with compound III may also be effected without solvent, i.e. by melting.

When benzenesulphonyl-isocyanate or a substitution product thereof is used as starting material of Formula III, this is dissolved in an anhydrous organic solvent, e.g. absolute benzene or toluene, and 3-amino-3-azabicyclo [3,2,2]nonane dissolved in the same solvent is slowly added at room temperature. The mixture is kept at 20–80° C. for ½ to 3 hours in order to complete the reaction and the final product is then worked up in manner known per se.

When a benzenesulphonyl-urea derivative is used as starting material of Formula III the process is effected by heating a mixture of the benzenesulphonyl-urea derivative, e.g. 4-toluenesulphonyl-urea or 4-chlorobenzenesulphonyl-urea, and 3-amino-3-azabicyclo[3,2,2]-nonane or a salt thereof, e.g. its hydrochloride, in a suitable solvent, e.g. ethyl acetate or acetonitrile, and, if the free base is used, also benzene or 1,2-dimethoxyethane, to the boiling temperature of the solvent for 5 to 24 hours, preferably in a stream of nitrogen. After cooling, the final product is isolated and purified in manner known per se.

The compounds of Formula I, in which R signifies the amino radical, cannot be produced in the manner described above, but may be obtained from the acetylamino or nitro compounds produced by the preceding methods, by splitting off the acetyl radical hydrolytically, preferably with an aqueous alkali, or reducing the nitro radical, e.g. catalytically with palladium on charcoal in dimethyl formamide.

In accordance with the process (b), equimolar quantities of an alkali metal or alkaline earth metal salt, preferably the sodium salt, of the correspondingly substituted benzenesulphonamide of Formula IV and a semicarbazide of Formula V, e.g. 1-(3-azabicyclo-[3,2,2]non-3-yl)-3,3-diphenyl-urea, are dissolved in a solvent, e.g. dimethyl formamide, and heated to about 100° C. in an oil bath. An excess amount of the semicarbazide may, however, also be used. The resulting alkali metal or alkaline earth metal salt of the compound I usually already crystallizes upon cooling and after isolation may be converted into the compound I by acidification. When no crystallization occurs, the solvent may, for example, be reduced to half its volume in a vacuum and water and some alkali added to the residue. The secondary amine which results as byproduct may then be removed by extraction with ether or a chlorinated hydrocarbon, e.g. chloroform, and after acidification (e.g. with acetic acid) the desired sulphonyl-semicarbazide may be obtained in pure form. The compounds obtained by this process may optionally be purified, e.g. by dissolving in dilute ammonia and precipitating with dilute hydrochloric acid.

The compounds of the invention are solid and crystalline compounds at room temperature; with ammonia, alkali metal or alkaline earth metal bases they form stable compounds which are crystalline at room temperature, e.g. the lithium, sodium, potassium or ammonium salts.

The heterocyclic sulphonyl-urea derivatives of the invention have valuable pharmacodynamic properties. Thus, in tests effected with animals (rats, dogs) they exhibit a marked blood sugar lowering effect of long duration, which occurs even upon administration of low doses. Furthermore, the compounds are well tolerated and have a low toxicity in comparison with their effectiveness. The compounds of the invention are therefore indicated for use in the treatment of Diabetes mellitus, in which case they are preferably administered orally in a daily dose of 100 to 1000 mg.

In order to produce suitable medicinal preparations the compounds are worked up with the usual organic or inorganic adjuvants which are inert and physiologically acceptable. Suitable medicinal preparations are, for example, tablets, dragées, capsules, syrups, injectable solutions. The preparations may contain adjuvants, e.g. polyvinyl pyrrolidone, methyl cellulose, talcum, magnesium stearate, stearic acid and sorbic acid, and suitable preserving agents, sweetening and colouring substances and flavourings.

Example of a galenical preparation—tablets:

| | G. |
|---|---|
| 1 - (3 - azabicyclo[3,2,2]non - 3 - yl)-3-(4-chlorobenzenesulphonyl)urea (compound of Example 1) | 0.100 |
| Magnesium stearate | 0.0010 |
| Polyvinyl pyrrolidone | 0.0040 |
| Talcum | 0.0050 |
| Maize starch | 0.010 |
| Lactose | 0.038 |
| Dimethyl silicone oil | 0.0005 |
| Polyethylene glycol-6000 | 0.0015 |
| For a tablet of | 0.160 |

The 3-amino-3-azabicyclo[3,2,2]nonane of Formula II used as starting material is new and together with the process for its production, forms part of the present invention. It may be produced by reacting 3-azabicyclo [3,2,2]nonane with sodium nitrite in aqueous mineral acid solution, e.g. in an aqueous sulphuric acid solution, in the cold, isolating the nitroso compound from the reaction mixture and purifying it by crystallization, and subsequently reducing the nitroso compound. The reduction of the nitroso radical to the amino radical may be effected in manner known per se with zinc in glacial acetic acid, formic acid in the presence of a catalytical amount of a mercury-II salt, e.g. mercury-II chloride, with lithium aluminum hydride in diethyl ether or tetrahydrofuran or with sodium amalgam in water or ethanol.

The benzenesulphonyl-carbamic acid, benzenesulphonyl-isocyanate and benzenesulphonyl-urea derivatives used as starting materials of Formula III are new and together with the process for their production, form part of the present invention. They may, for example, be obtained from the known benzenesulphonamides which may be substituted in the 4-position of the phenyl radical.

The sulphonyl-carbamic acid esters, e.g. the methyl or ethyl ester, are obtained in that a 4-alkylsulphinyl-benzene- or a 4-alkylsulphonyl-benzene-sulphonamide is treated with a chloroformic acid ester in a suitable organic solvent, e.g. acetone, in the presence of an alkaline condensation agent, e.g. sodium or potassium carbonate, at 40–70° C. for 5 to 8 hours. The compound which precipitates from the cooled reaction mixture is subsequently dissolved in water and the aqueous solution is acidified with a mineral acid, e.g. concentrated hydrochloric acid, whereupon the desired benzenesulphonyl-carbamic acid ester precipitates and is isolated by filtration and subsequently purified, e.g. by crystallization.

The 4 - alkylsulphinyl - benzene- or 4 - alkylsulphonyl - benzene - sulphonyl - isocyanates used as starting materials may be produced in that the corresponding sulphonamide is heated to about 150–200° C. with phosgene in a suitable organic solvent, e.g. di- or trichlorobenzene, preferably 1,2,4 - trichlorobenzene, the solvent is removed from the cooled reaction mixture by distillation and the desired sulphonyl - isocyanate is isolated and purified in manner known per se, e.g. by crystallization.

4 - alkylsulphinylbenzene- or 4 - alkylsulphonylbenzene - sulphonyl - urea may, for example, be obtained as follows:

The corresponding sulphonamide is heated for 4 to 6 hours with an alkali metal cyanate in aqueous alcoholic solution, the precipitated alkali metal salt is subsequently filtered off from the cooled reaction mixture, is dissolved in a small amount of water, the aqueous solution is made strongly acid with a dilute mineral acid, e.g. dilute hydrochloric acid, and the 4 - alkylsulphinylbenzene- or 4 - alkylsulphonylbenzene - sulphonyl - urea derivative is isolated therefrom in manner known per se.

The starting materials of Formula V are also new and together with the process for their production form part of the present invention. They may be obtained from the corresponding carbamoyl halides of formula VI,

VI in which

Ar has the above significance, and
Hal signifies a chloride or bromine atom, and 3 - amino - 3 - azabicyclo[3,2,2]nonane of Formula II. For example, the two reagents are heated in aqueous alcoholic solution or in an organic solvent, e.g. 1,2- dimethoxyethane or dimethyl formamide, in the presence of an acid binding agent, e.g. sodium or potassium carbonate or bicarbonate, or an additional equivalent of 3 - amino - 3 - azabicyclo[3,2,2]nonane, for one hour on a water bath or the solution is stirred at room temperature for 4 to 8 hours. The desired semicarbazides may be isolated and purified in manner known per se.

In the following non-limitative examples all temperatures are indicated in degrees centigrade and are uncorrected.

The term "in manner known per se" as used herein designates methods in use or described in the literature on the subject.

Example 1.—1-(3-azabicyclo[3,2,2]non-3-yl)-3-(4-chlorobenzenesulphonyl)urea

A solution of 10.2 g. of 3 - amino - 3 - azabicyclo [3,2,2]nonane(melting point 75–77°) and 19.3 g. of 4-chlorobenzenesulphonyl-carbamic acid ethyl ester in 95 ml. of benzene is heated to the boil at reflux whilst stirring for 4 hours. The reaction mixture is subsequently cooled, the precipitated material is filtered off and recrystallized from ethylene chloride. The compound indicated in the heading has a melting point of 202–204° (decomposition).

Sodium salt.—15 g. of 1 - (3 - azabicyclo[3,2,2]non-3 - yl) - 3 - (4 - chlorobenzenesulphonyl)urea are suspended in 150 ml. of methanol and a filtered solution of 1.9 g. of sodium hydroxide in 150 ml. of methanol is added to this suspension. On combining these two materials a clear solution results which is filtered and 200 ml. of ether are then added thereto. After standing for 1 to 2 hours the precipitated sodium salt is filtered off and washed four times, each time with 150 ml. of absolute ethanol/ether (1:1). After drying in a high vacuum at 85° over phosphorus pentoxide the analytically pure sodium salt of the compound indicated in the heating is obtained.

The 3 - amino - 3 - azabicyclo[3,2,2]nonane used as starting material is produced as follows:

(a) 3 - nitroso - 3 - azabicyclo[3,2,2]nonane.—30 ml. of aqueous 50% sulphuric acid are slowly added at 2–5° whilst stirring and cooling to a suspension of 25.0 g. of 3 - azabicyclo[3,2,2]nonane in 170 ml. of water, whereby the material does not dissolve completely. An ice cooled solution of 55.3 g. of sodium nitrite in 80 ml. of water is subsequently added to the suspension at 0° to +3° during the course of 2 to 2½ hours whilst stirring is continued. Stirring is continued for 30 minutes whilst cooling and the mixture is allowed to stand over night. The resulting solid material is filtered and then dissolved in ether. After drying the ether solution over sodium sulphate and evaporating the solvent the residue is recrystallized from n-hexane. 3 - nitroso - 3 - azabicyclo [3,2,2]nonane is obtained as a yellowish compound having a melting point of 161–164°.

(b) 3 - amino - 3 - azabicyclo[3,2,2]nonane.—18.1 g. of 3 - nitroso - 3 - azabicyclo[3,2,2]nonane are dissolved in 200 ml. of methanol, the solution is cooled to −7° and 60 g. of zinc dust and 105 ml. of glacial acetic acid are added portionwise to this solution during the course of 4 hours. After the addition has been completed stirring is effected at room temperature for a further 3 hours, the undissolved material is filtered off and the clear filtrate is concentrated to a mesh. The residue is made alkaline with 350 ml. of aqueous 40% sodium hydroxide and the viscous solution is extracted thrice with 500 ml. of ether. The combined ether extracts are dried over sodium sulphate and concentrated to a mash. This mash is dissolved in absolute ethanol and a solution of hydrochloric acid in ethanol is added thereto until an acid reaction is obtained, whereby the hydrochloride of 3 - amino - 3 - azabicyclo[3,2,2]nonane crystallizes. Melting point 182–185° (decomposition). This base is obtained in that the hydrochloride is dissolved in water, made alkaline with concentrated sodium hydroxide and the resulting base is subsequently extracted with ether. Melting point 75–77° from n-hexane.

The following compounds are obtained in an analogous manner:

Example 2.—1-(3-azabicyclo[3,2,2]non-3-yl)-3-(4-methylthiobenzenesulphonyl)urea

This compound is obtained from 7.0 g. of 3-amino-3 - azabicyclo[3,2,2]nonane and 13.8 g. of 4 - methylthiobenzenesulphonyl - carbamic acid ethyl ester. Melting point 164–168° (decomposition) [from a small amount of benzene].

Example 3.—1-(3-azabicyclo[3,2,2]non-3-yl)-3-(4-bromobenzenesulphonyl)urea

This compound is obtained from 7.0 g. of 3-amino-3 - azabicyclo[3,2,2]nonane and 15.4 g. of 4 - bromobenzenesulphonyl-carbamic acid ethyl ester. Melting point 207–209° (decomposition) [from ethylene chloride].

Example 4.—1-(3-azabicyclo[3,2,2]non-3-yl)-3-(4-toluenesulphonyl)urea

This compound is obtained from 7.0 g. of 3 - amino-3 - azabicyclo[3,2,2]nonane and 12.2 g. of 4 - toluenesulphonylcarbamic acid ethyl ester. Melting point 181–183° (decomposition) [from ethylene chloride].

Example 5.—1-(3-azabicyclo[3,2,2]non-3-yl)-3-(4-nitrobenzenesulphonyl)urea

This compound is obtained from 20.5 g. of 4-nitrobenzenesulphonyl-carbamic acid ethyl ester (melting point 133–134°) and 10.5 g. of 3-amino-3-azabicyclo[3,2,2] nonane. Melting point 211–213° (decomposition) [from dimethyl formamide/absolute ethanol].

Example 6.—1-(3-azabicyclo[3,2,2]non-3-yl)-3-(4-methoxy-benzenesulphonyl)urea

This compound is obtained from 19.5 g. of 4-methoxybenzenesulphonyl-carbamic acid ethyl ester (melting point 117–118°) and 11.2 g. of 3-amino-3-azabicyclo[3,2,2] nonane. Melting point 179–181° (decomposition) [from ethylene chloride].

Example 7.—1-(3-azabicyclo[3,2,2]non-3-yl)-3-benzenesulphonyl-urea

A solution of 11.5 g. of benzenesulphonyl-carbamic acid ethyl ester and 7.0 g. of 3-amino-3-azabicyclo[3,2,2] nonane in 50 ml. of benzene is heated to the boil at reflux whilst stirring for 4 hours. After reducing the volume of the reaction solution ether/carbon tetrachloride is added to the oil obtained as residue. The crystalline crude product is then filtered off and recrystallized from a small amount of ethylene chloride. The compound indicated in the heading has a melting point of 174–176° (decomposition).

Example 8.—1-(3-azabicyclo[3,2,2]non-3-yl)-3-(4-ethylbenzenesulphonyl)urea

A solution of 19.4 g. of 4-ethylbenzenesulphonyl-carbamic acid ethyl ester (melting point 50–54°) and 10.5 g. of 3-amino-3-azabicyclo[3,2,2]nonane in 75 ml. of benzene is heated to the boil at reflux whilst stirring for 4 hours. After reducing the volume of the reaction solution the oil obtained as residue is crystallized from ether. After recrystallization from carbon tetrachloride the compound indicated in the heading has a melting point of 141–143° (decomposition).

Example 9.—1-(3-azabicyclo[3,2,2]non-3-yl)-3-(4-acetylaminobenzenesulphonyl)urea A suspension of 28.6 g. of 4-acetylamino-benzenesulphonyl-carbamic acid ethyl ester and 14.0 g. of 3-amino-3-azabicyclo[3,2,2]nonane in 500 ml. of 1,2-dimethoxyethane is heated to the boil at reflux whilst stirring for 7 hours. The suspension is cooled, filtered and the resulting material is recrystallized from dimethyl formamide/ acetonitrile. The compound indicated in the heading has a melting point of 224–226° (decomposition).

Example 10.—1-(3-azabicyclo[3,2,2]non-3-yl)-3-(4-amino-benzenesulphonyl)urea

A solution of 16.0 g. of 1-(3-azabicyclo[3,2,2]non-3-yl)-3-(4-acetylaminobenzenesulphonyl)urea and 6 g. of sodium hydroxide in 250 ml. of water is heated to the boil at reflux whilst stirring for 3 hours. The suspension which results during the reaction is cooled, is made weakly acid with 10% aqueous hydrochloric acid and the undissolved material is filtered off. The resulting crude product is dried and recrystallized from acetonitrile. The compound indicated in the heading has a melting point of 184–186° (decomposition).

Example 11.—1-(3-azabicyclo[3,2,2]non-3-yl)-3-(4-methyl-sulphinylbenzenesulphonyl)urea A solution of 4.2 g. of 3-amino-3-azabicyclo[3,2,2] nonane in 25 ml. of absolute benzene is added dropwise during the course of 10 minutes to a solution of 8.7 g. of 4-methylsulphinylbenzenesulphonyl-carbamic acid ethyl ester in 25 ml. of absolute benzene. The reaction solution is heated to the boil at reflux for 6 hours, is subsequently cooled to room temperature, the benzene is decanted and the oily residue stirred in 30 ml. of chloroform for 10 minutes, whereby 1-(3-azabicyclo[3,2,2]non-3-yl)-3-(4-methylsulphinylbenzenesulphonyl)urea results in crystalline form. Melting point 202–203°.

The 4-methylsulphinylbenzenesulphonyl-carbamic acid ethyl ester used as starting material is produced as follows: 53.5 g. of chloroformic acid ethyl ester are added dropwise during the course of 3 hours to a suspension of 82 g. of 4-methylsulphinylbenzene-sulphonamide and 134.5 g. of potassium carbonate in 460 ml. of absolute acetone, whereby the reaction temperature rises to 40°. The reaction mixture is subsequently heated to the boil at reflux for a further 18 hours. The precipitated material is filtered off from the cooled reaction mixture, the residue is dissolved in 2000 ml. of water, the alkaline solution is made strongly acid with concentrated hydrochloric acid and the compound resulting as an oil is extracted thrice, each time with 400 ml. of chloroform. The combined chloroform extracts are washed with water, dried and reduced in volume, whereby 4-methylsulphinylbenzenesulphonyl-carbamic acid ethyl ester results in crystalline form. Melting point 146–148°.

Example 12.—1-(3-azabicyclo[3,2,2]non-3-yl)-3-(4-methyl-sulphonylbenzenesulphonyl)urea A solution of 4.2 g. of 3-amino-3-azabicyclo[3,2,2] nonane in 20 ml. of absolute benzene is added dropwise during the course of 10 minutes to a suspension of 9.2 g. of 4-methylsulphonylbenzenesulphonyl-carbamic acid ethyl ester in 30 ml. of absolute benzene. The reaction solution is heated to the boil at reflux for 6 hours, is subsequently cooled to room temperature, whereby 1-(3-azabicyclo[3,2,2]non-3-yl)-3-(4-methylsulphonylbenzenesulphonyl) urea results in crystalline form. After recrystallization from acetone the compound has a melting point of 192–192°.

The 4-methylsulphonylbenzenesulphonyl-carbamic acid ethyl ester used as starting material is produced as follows: 60.7 g. of chloroformic acid ethyl ester are added dropwise during the course of 10 minutes to a suspension of 101 g. of 4-methylsulphonylbenzenesulphonamide and 153 g. of potassium carbonate in 525 ml. of absolute acetone and the mixture is heated to the boil at reflux whilst stirring for 16 hours. The precipitated material is filtered off from the cooled reaction mixture. The dry residue is dissolved in 2000 ml. of water, the alkaline solution is made strongly acid by the careful addition of concentrated hydrochloric acid, the precipitated crystalline product is filtered off, washed with water and dried. After recrystallization from ethanol 4-methylsulphonylbenzenesulphonyl-carbamic acid ethyl ester has a melting point of 124–126°.

Example 13.—1-(3-azabicyclo[3,2,2]non-3-yl)-3-(4-acetylbenzenesulphonyl)urea

A solution of 49.5 g. of 1-(3-azabicyclo[3,2,2]non-3-yl)-3,3-diphenyl-urea and 35.7 g. of the sodium salt of 4-acetylbenzene-sulphonamide in 350 ml. of dimethyl formamide is heated to the boil at reflux whilst stirring for one hour. The solution is evaporated to a mash in a vacuum, the residue dissolved in water and extracted with ether. The aqueous phase is acidified with 2 N hydrochloric acid and the crude product is filtered off. The compound indicated in the heading is recrystallized from acetonitrile and has a melting point of 179–181° (decomposion).

The 1-(3-azabicyclo[3,2,2]non-3-yl)-3,3-diphenyl-urea used as starting material is produced as follows:

28.0 g. of 3-amino-3-azabicyclo[3,2,2]nonane are added dropwise during the course of 30 minutes to a solution of 23.2 g. of diphenylcarbamoyl chloride in 250 ml. of 1,2-dimethoxyethane and the mixture is then stirred at room temperature for a further 1½ hours. After cooling in an ice bath the precipitated hydrochloride is filtered off and the mother liquor concentrated in a vacuum. The residue is taken up in 1,2-dimethoxyethane and crystallizes. The crude product is recrystallized from ligroin. 1-(3-azabicyclo[3,2,2]non-3-yl)-3,3-diphenyl-urea has a decomposition point of 165–168°.

Example 14.—1-(3-azabicyclo[3,2,2]non-3-yl)-3-(4-toluenesulphonyl)urea 7.0 g. of 4-toluenesulphonyl-isocyanate dissolved in 24 cc. of toluene are added portionwise whilst swirling around to a suspension of 5.6 g. of 3-amino-3-azabicyclo(3,2,2]-nonane in 10 cc. of toluene. The reaction mixture is heated on a water bath for a short time and is evaporated to dryness in a vacuum. The semicrystalline residue is crystallized from ethylene chloride, whereby the compound indicated in the heading, having a melting point of 181–183° (decomposition), is obtained.

Example 15.—1-(3-azabicyclo[3,2,2]non-3-yl)-3-(4-toluenesulphonyl)urea

A suspension of 10.7 g. of 4-toluenesulphonyl-urea and 8.8 g. of 3-amino-3-azabicyclo[3,2,2]nonane hydrochloride (melting point 220–222° with decomposition) in 100 cc. of ethyl acetate is heated at reflux whilst stirring for 18 hours. After cooling, the reaction solution is concentrated in a vacuum.

The brownish oily residue is distributed between aqueous sodium acetate sotlution and chloroform. The chloroform phase is rewashed with water, dried over sodium sulphate and concentrated, from which crystalline material is obtained. This crude product is recrystallized twice from ethylene chloride and yields the analytically pure compound indicated in the heading, having a melting point of 181–183°.

Example 16.—1-(3-azabicyclo[3,2,2]non-3-yl)-3-(4-toluenesulphonyl)urea

A suspension of 10.7 g. of 4-toluenesulphonyl-urea and 7.0 g. of 3-amino-3-azabicyclo[3,2,2]nonane in 100 cc. of ethyl acetate is heated at reflux whilst stirring for 18 hours. Soon after heating has begun ammonia begins to escape from the reaction solution. The reaction mixture is cooled and the solid substance is filtered off. This crude product has a melting point of 172–175°. After recrystallizing once from ethyl acetate the compound indicated in the heading is obtained, having a melting point of 179–181°.

Example 17.—1-(3-azabicyclo[3,2,2]non-3-yl)-3-(4-chlorobenzenesulphonyl)urea

A suspension of 11.8 g. of 4-chlorobenzenesulphonylurea and 7.0 g. of 3-amino-3-azabicyclo[3,2,2]nonane in 100 cc. of ethyl acetate is heated at reflux whilst stirring for 16 hours. After stirring for half an hour a thick mash results, whereupon a further 100 cc. of ethyl acetate are added. The reaction mixture is cooled and the solid substance, having a melting point of 197–199°, is filtered off. After recrystallizing once from ethylene chloride the analytically pure compound indicated in the heading, having a melting point of 202–204° (decomposition), is obtained.

What is claimed is:

1. A compound selected from the group consisting of a compound of the formula:

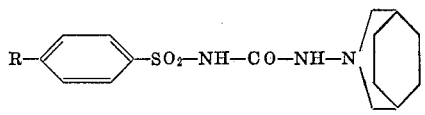

in which R is hydrogen chlorine, or bromine, alkyl, alkoxy, alkylthio, alkylsulphinyl, or alkylsulphonyl, each of 1 to 4 carbon atoms, acetyl nitro, amino or acetylamino, and physiologically acceptable alkali metal, alkaline earth metal and ammonium salts thereof.

2. A compound according to claim 1, in which the compound is 1-(3-azabicyclo[3,2,2]non-3-yl)-3-(4-chlorobenzenesulphonyl)urea.

3. A compound according to claim 1, in which the compound is 1-(3-azabicyclo[3,2,2]non-3-yl)-3-(4-methylthiobenzenesulphonyl)urea.

4. A compound according to claim 1, in which the compound is 1-(3-azabicyclo[3,2,2]non-3-yl)-3-(4-bromobenzenesulphonyl)urea.

5. A compound according to claim 1, in which the compound is 1 - (3 - azabicyclo[3,2,2]non-3-yl)-3-(4-toluenesulphonyl)urea.

6. A compound according to claim 1, in which the compound is 1-(3-azabicyclo[3,2,2]non-3-yl)-3-(4-nitrobenzenesulphonyl)urea.

7. A compound according to claim 1, in which the compound is 1-(3-azabicyclo[3,2,2]non-3-yl)-3-(4-methoxybenzenesulphonyl)urea.

8. A compound according to claim 1, in which the compound is 1-(3-azabicyclo[3,2,2]non-3-yl)-3-benzenesulphonyl-urea.

9. A compound according to claim 1, in which the compound is 1-(3-azabicyclo[3,2,2]non-3-yl)-3-(4-ethylbenzenesulphonyl)urea.

10. A compound according to claim 1, in which the compound is 1-(3-azabicyclo[3,2,2]non-3-yl)-3-(4-acetylaminobenzenesulphonyl)urea.

11. A compound according to claim 1, in which the compound is 1-(3-azabicyclo[3,2,2]non-3-yl)-3-(4-aminobenzenesulphonyl)urea.

12. A compound according to claim 1, in which the compound is 1-(3-azabicyclo[3,2,2]non-3-yl)-3-(4-methylsulphinylbenzenesulphonyl)urea.

13. A compound according to claim 1, in which the compound is 1-(3-azabicyclo[3,2,2]non-3-yl)-3-(4-methylsulphonylbenezenesulphonyl)urea.

14. A compound according to claim 1, in which the compound is 1-(3-azabicyclo[3,2,2]non-3-yl)-3-(4-acetylbenzenesulphonyl)urea.

References Cited

FOREIGN PATENTS 6,410,217   3/1965   Netherlands.

HENRY R. JILES, *Primary Examiner.*

C. M. SHURKO, *Assistant Examiner.*

U.S. Cl. X.R.

260—239, 397.7, 453, 556, 470, 544; 424—229, 244